3,538,202
UTILIZING ALUMINUM MONO-ORTHOPHOSPHATE AS FUGITIVE BINDER IN MANUFACTURE OF SINTERED POROUS ALUMINA ARTICLES
Jean-Claude Bidard, Rueil-Malmaison, France, assignor to Commissariat a l'Energie Atomique, Paris, France
No Drawing. Continuation of application Ser. No. 718,187, Apr. 2, 1968. This application Dec. 11, 1969, Ser. No. 880,496
Claims priority, application France, Apr. 7, 1967, 101,917
Int. Cl. C04b 21/06, 33/12, 35/10
U.S. Cl. 264—44                            1 Claim

ABSTRACT OF THE DISCLOSURE

An aqueous solution of aluminum mono-orthophosphate is used as a fugitive binder for alumina particles. Alumina, 5–15% of aluminum mono-orthophosphate, and 20–25% of a plasticizer are shaped by isostatic pressure, heated to 300–400° C. to polymerize the binder, and then sintered at 1600–1800° C. in an argon atmosphere containing 2–10% hydrogen to dissociate the aluminum phosphate and to reduce the $P_2O_5$ content of the sintered alumina body to less than 250 p.p.m.

---

This application is a continuation of Ser. No. 718,187 filed on Apr. 2, 1968 and now abandoned.

The present invention relates to a method of fabrication of porous bodies of alumina as well as the porous bodies obtained by this method. The essential aim of the invention is to facilitate and to accelerate the sintering of alumina while avoiding the presence within the bodies obtained of compounds other than alumina which could be detrimental to their properties and in particular to their porosity.

It is well known that the baking of thin-walled parts of high-purity alumina without binding agents presents a large number of difficulties arising from their brittleness during the thermal cycle. Operating conditions are therefore critical, both in regard to the arrangement of such parts in the furnace and in regard to temperature rise times.

It is also well known that the addition of oxides as binding or fluxing agents is liable to modify the intrinsic inertia of alumina with respect to some fluorinated agents and that, in the case of a porous product, the presence of addition elements between the alumina grains results in an appreciable reduction in the permeability which can normally be expected of a high-purity alumina which has been partially sintered.

The present invention is directed to the basic concept of a method whereby partially sintered porous bodies of high-purity alumina can be fabricated with extremely rapid baking cycles, this result being achieved by making use of a binder having an aluminum phosphate base which is destroyed during the sintering operation.

The method according to the invention is essentially characterized in that it comprises mixing an alumina powder with a binder having an aluminum phosphate base, shaping the mixture thus obtained, heating the products obtained by shaping at a temperature which is sufficient to induce polymerization of said binder, sintering being then carried out at a sufficient temperature to cause the dissociation of the aluminum phosphate.

The binder which is incorporated in the alumina powder is preferably aluminum monophosphate in aqueous solution and in proportions which are advantageously within the range of 5 to 15% by weight with respect to the alumina powder. The mixture is shaped, for example, by extrusion or by molding under isostatic pressure.

Heating of the products obtained by shaping prior to sintering results in hardening of the aluminum phosphate binder which thus ensures the cohesion of the product. The heating process is preferably carried out at a temperature within the range of 200 to 600° C. The product can then be brought rapidly to the sintering temperature of the alumina. During the sintering process which is advantageously carried out at temperatures within the range of 1600 to 1800° C., the alumina phosphate dissociates by liberating the phosphorus pentoxide $P_2O_5$ which is eliminated or reduced and by leaving high-purity alumina in the product. This dissociation is consequently favorable to the production of alumina bodies having very high purity and high porosity. The alumina which is left in the product is highly reactive, takes part in the sintering of the initial particles of $Al_2O_3$, and consolidates the support which is thus formed.

The examples given hereinafter illustrate the application of the invention to particular cases. These examples cannot be interpreted in any sense as implying any limitation in the scope of this patent.

EXAMPLE 1

There is added to an alpha-alumina or gamma-alumina powder a weighed amount of 5 to 15% aluminum mono-orthophosphate in solution which is obtained by reacting orthophosphoric acid with hydrate of alumina at boiling point. Rotating arm mixers and light mullers are employed for this purpose. A selected percentage of plasticizing agents such as paraffin, petroleum jelly or carboxy methylcellulose is incorporated with the mixture. The paste is extruded in the form of tubes with an extrusion press at a rate of 10 to 100 meters per minute. After drying, the rigidity of the parts is ensured by pre-baking at 300–400° C. in air during which the mono-orthophosphate polymerizes and establishes a bond between the alumina grains.

The sintering baking process is carried out in a horizontal or vertical induction furnace in an argon atmosphere which preferably contains 2 to 10% hydrogen and at temperatures lower than 1500° C. and preferably in the range of 1600 to 1800° C., for periods of time which vary from one-half hour to one hour with a heating rate of 800° C. per hour. Starting from 1500° C., the polyphosphate dissociates into alumina and phosphorus pentoxide which is liberated and trapped at a cold point of the furnace.

The properties of permeability and pore radius can be varied according to the choice of the initial alumina powder, the temperature and the sintering time.

EXAMPLE 2

An alternative method consists in molding an alumina powder to which is added solely aluminum mono-orthophosphate by isostatic compression between a central metallic core and a rubber membrane. The aggregate is compressed after having created a partial vacuum between the membrane and the metallic core. Pressures of at least 200 kg./cm.² produce a sufficient degree of compactness to permit machining of the outer surface of the tubes in the crude state. Said tubes are baked at 300–400° C. in air with the metallic core. The core is eliminated spontaneously provided that it is formed of an alloy which melts below these temperatures. The parts are then sintered under similar conditions at temperatures within the range of 1600 to 1800° C. for a period of time of 30 to 60 minutes with a heating rate of 800° C. per hour.

The final properties of permeability can also be adapted according to the molding pressure.

It must be noted that, by means of the abovedescribed alternative form of the method, parts made up of concentric layers having different particle sizes can readily be formed by successive molding and machining.

EXAMPLE 3

In accordance with the process described in Example 1, there was treated an alumina powder to which was added a weighed abount of 10% of alumina phosphate in the form of an aqueous solution and 25% by weight of paraffin. The mixture was heated to 100° C. for a period of 2 to 3 hours in order to eliminate the water and paraffin content, maintained at 400° C. for a period of four hours in order to induce polymerization of the binder, then subjected to a heat treatment and sintering process for two hours including a level-temperature stage for one-half hour at 1650° C.

The products thus obtained had the following proptrties.

alumina content higher than 99%
phosphorous content lower than 100 p.p.m. (limit of chemical analysis)
bulk specific gravity=1.3 to 1.5
mean radius of pores comprised between 2.5 and 3$\mu$
permeability of the order of 35 moles air/cm.$^2$ sec. per kg./cm.$^2$ of difference in pressure
permeability: 12 cm.$^2$ sec.$^{-1}$ bar$^{-1}$ $\Delta$P
mean radius in air: ~2.5$\mu$
radius of largest pore: ~3.5$\mu$
roughness: 1.5 to 2$\mu$ CLA
crushing strength: 15 bars (test performed between plates of hard rubber at right angles to the axis of the tube and over a length of tube of 10 mm.)
resistance to isostatic compression: 1500 bars
purity: P$_2$O$_5$ <250 p.p.m.

EXAMPLE 4

Again according to the same process as described in Example 1, the alumina powder was treated together with 10% by weight of aluminum phosphate, added in the form of an aqueous solution, and 20% by weight of a mixture comprising ⅔ paraffin and ⅓ petroleum jelly. The temperature and time conditions were the same as in Example 3 for the first heating step and the polymerization step. But the sintering process was performed by heating the product for 40 minutes in an atmosphere of argon containing 5–6% hydrogen, with a level temperature stage of 12 minutes at 1725° C.

The products thus obtained have shown the following properties.

permeability 12 moles air/cm.$^2$ sec. per kg./cm.$^2$
means radius in air: ~2.5$\mu$
radius of largest pore: ~3.5$\mu$
roughness: 1.5 to 2$\mu$
crushing strength: 15 kg./cm.$^2$
resistance to isostatic compression: 1500 kg./cm.$^2$
purity: P$_2$O$_5$ content <250 p.p.m.

I claim:
1. In a method of fabrication of porous bodies of alumina having a permeability on the order of 12–35 moles air/cm.$^2$ sec. kg./cm.$^2$, the steps of mixing alpha or gamma alumina grains to provide a pore radius range from 2.5 to 3.5 microns with an aqueous solution of aluminum mono-orthophosphate, the aluminum mono-orthophosphate being between 5 and 15% by weight of the alumina powder and with a plasticiser between 20–25% by weight of the mixture selected from the group consisting of paraffin, petroleum jelly and carboxymethylcellulose, shaping this mixture under isostatic pressure, heating the products obtained by shaping at a temperature from 300 to 400° C. for four hours in air to induce polymerization of said aluminum mono-orthophosphate, and then sintering the heated product in an argon atmosphere containing 2 to 10% hydrogen at a temperature from 1600 to 1800° C. to dissociate the aluminum phosphate and to reduce the P$_2$O$_5$ content of the sintered alumina body to less than 250 p.p.m.

References Cited

UNITED STATES PATENTS

| | | | |
|---|---|---|---|
| 2,422,809 | 6/1947 | Stupakoff et al. | 264—63 |
| 2,425,151 | 8/1947 | Greger | 106—108.5 |
| 2,425,152 | 8/1947 | Greger | 106—108.5 |
| 2,630,616 | 3/1953 | Robinson | 106—65 |
| 2,852,401 | 9/1958 | Hansen et al. | 106—65 |
| 2,966,421 | 12/1960 | Zimmerman et al. | 106—65 |
| 3,051,566 | 8/1962 | Schwartz | 264—63 |
| 3,131,239 | 4/1964 | Matrot et al. | 264—63 |
| 3,274,008 | 9/1966 | Braunwarth et al. | 106—65 |
| 3,329,516 | 7/1967 | Chvatal | 106—65 |
| 3,438,620 | 4/1969 | Renkey | 106—65 |

FOREIGN PATENTS 519,885   4/1940   Great Britain.

DONALD J. ARNOLD, Primary Examiner

J. H. MILLER, Assistant Examiner

U.S. Cl. X.R.

106—41, 65, 108.5; 264—59, 63, 65, 66